2 Sheets—Sheet 1.

E. D. STEWART.
HARVESTER.

No. 187,328. Patented Feb. 13, 1877.

Witnesses
William W. Osborn
Edward H. Osborn

Inventor
Edward D. Stewart
By C. W. Smith
His Attorney.

2 Sheets—Sheet 2.

E. D. STEWART.
HARVESTER.

No. 187,328. Patented Feb. 13, 1877.

Witnesses:
William W. Osborn
Edward R. Osborn

Inventor:
Edward D. Stewart
By C. W. Smith
His Attorney.

UNITED STATES PATENT OFFICE.

EDWARD D. STEWART, OF WHEATLAND, CALIFORNIA.

IMPROVEMENT IN HARVESTERS.

Specification forming part of Letters Patent No. 187,328, dated February 13, 1877; application filed May 29, 1876.

*To all whom it may concern:*

Be it known that I, EDWARD D. STEWART, of Wheatland, California, have invented an Improvement in Harvesters or Headers, of which the following is a specification:

My invention relates to that class of reaping-machines known as "headers," that operate to cut off the heads of grain and convey them into the wagon traveling with it.

It consists in several new and useful improvements in the mechanism of the machine, as will be more fully described hereafter.

Figure 1:
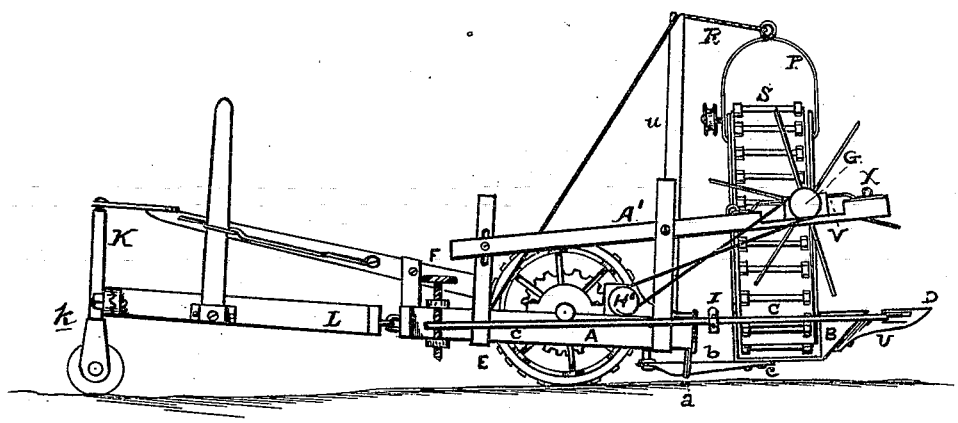
Figure 2:
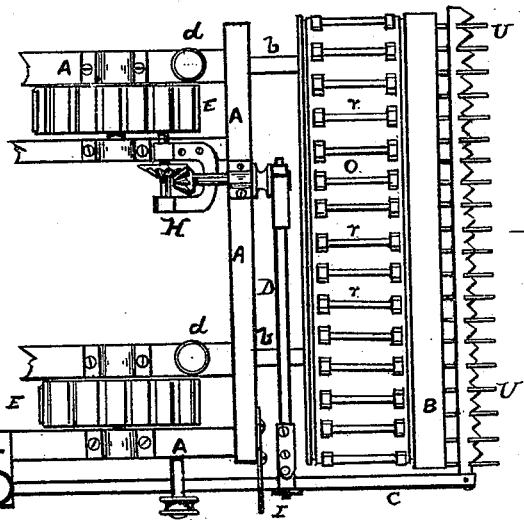
Figure 5:
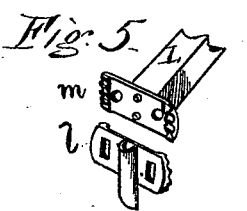
Figure 3:
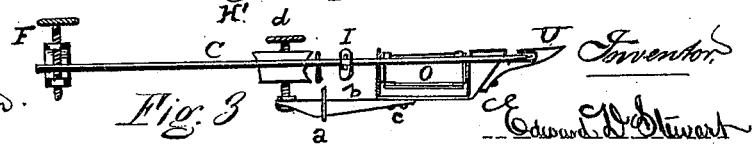
Figure 4:
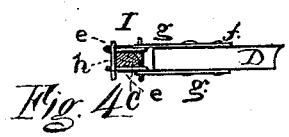
Figure 6:
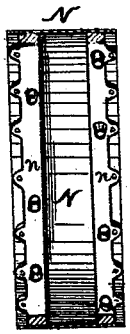
Figure 7:
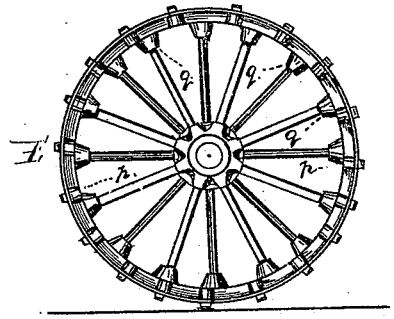
Figure 8:
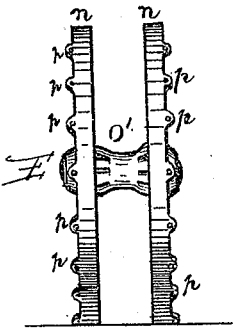
Figure 9:
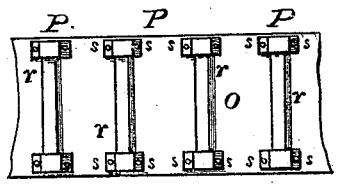
Figure 10:
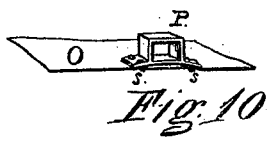
Figure 11:
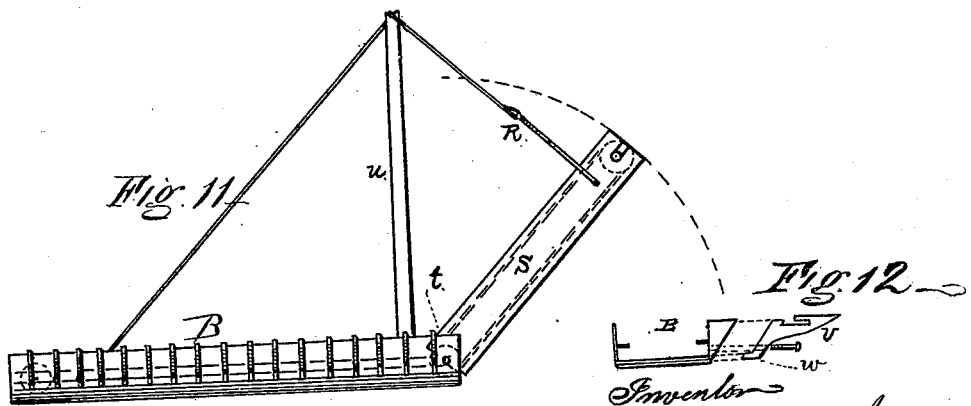
Figure 12:
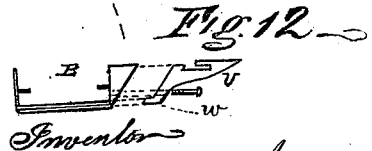

The accompanying drawings, herein referred to for a better understanding of my invention, show, in Figure 1, a side view of my improved machine; in Fig. 2, a top view of the front end of the same; in Fig. 3, a detail view of the sickle-bar and the sickle-beam operating the knives; and in Fig. 4, a detail view of the manner of attaching the pitman to the sickle-beam. Fig. 5 shows a detail view of the manner of adjusting and securing the tiller. Figs. 6, 7, and 8 are enlarged views of the master-wheel. Figs. 9 and 10 are enlarged views of the draper-apron and thimbles. Figs. 11 and 12 are enlarged views of the sickle-beam and draper and of the finger-guard.

A represents the frame of the machine; B, the sickle-bar; C, the sickle-beam operating the knives; D, the pitman, operated from the main wheel E through the medium of the bevel-gearing H. This sickle-bar is made in one piece, in the form of a tray, with its front face, or the side that holds the sickle and guards, made of a bevel shape or at an angle. The bottom of the bar is supported upon the arms *v v*, secured to it at *c*, and hinged at *a* to the frame of the machine. The other ends of these arms, *b b*, are provided with hand-screws *d d*, that act to raise or lower the ends of the arms, and consequently to raise or depress the front end of the bar and its sickle. The sickle-beam is also adjustable by a set-screw, F, so that the end of the beam attached to the sickles can be raised or depressed, or so that the beam may be kept in a horizontal position.

Thus, where the machine is working on a side hill or with its head downhill, the cutter-bar B and the sickle-beam C can by this means be adjusted to work in a horizontal plane, and cut the grain so that it will fall properly on the apron and be carried to the wagon. In other machines not having this adjustability, the grain, when cut by the sickle in a slanting direction, where the machine is working downhill, will have a tendency to fall away from the reel G, and a considerable portion of it is therefore lost, and not received upon the apron.

The pitman D is connected by the strap-fastening I to the sickle-beam C, without mortising or weakening the beam by cutting into it. This connection I consists of two plates, *e e*, secured to the pitman at *f*, and jointed to the straps *g g*, one above and the other below the beam C, and connected together by the yoke *h*. This connection of the pitman with the sickle-beam allows of the adjustment of the beam without strain upon it or upon the pitman, and allows the two to be joined without affecting the strength of the beam. K is the tiller for guiding the direction of the machine. It is held in position by the set-screws *k k*, that pass through slots in the notched plate *l*, and through screw-holes in a similar plate, *m*, secured to the head of the tongue L. These plates *l m* have notches upon the sides, that engage with each other when the plates are in contact, and hold the tongue-plate *m* in any position in which it may be adjusted.

When, therefore, any twist or torsion upon the tongue has thrown it out of position, the tiller may always be adjusted to maintain a perpendicular position by setting the plate *l*, and holding it by the set-screws *k k*. The strain upon the tongue in these machines causes them in time to become twisted out of place, or so that the tiller is thrown more or less out of the position it should occupy, in order to properly direct the movements of the machine. My improvement allows the position of the tiller to be adjusted whenever it is thrown out of line.

This part of my invention is illustrated in the detail views in Fig. 5. The wheels E of the machine that give motion to the working parts are preferably made with a double set of spokes, one behind the other, in alternation, as shown in Fig. 7 of the drawing. Each of these sets is surrounded by a band, $n$, forming the felly, and upon these bands the tire N is placed, and secured by means of bolts that pass through the tire, and through the ears $p\ p$ on the edge of the bands.

The inner face of the bands has projecting sockets $q\ q$ for the heads of the spokes, and the hub is made with a double row of holes for the ends of the spokes, one side being in alternation with the other. One set of spokes in each wheel is made square, or with flat sides, that the gears for driving the sickle-pitman, and for operating the reel and the draper, may be secured to them.

The construction of these several parts is shown in Figs. 6, 7, and 8. This form of wheel gives greater strength, with lightness in weight, and allows the gearing to be secured to it without becoming loose, and working imperfectly, or out of line with the pinions.

The thimbles P, that hold the slats $r\ r$ upon the draper-apron O, are preferably made in one piece, with ears $s$ for securing them to the apron, and their base-plate is bent slightly concave, that they may pass over the rollers of the draper. In the aprons of the drapers now in general use, the slats are secured immediately to the apron, and they soon work loose from the bolts, and injure the apron and the draper, when the machine is working, by becoming entangled with them. But this manner of securing the slats enables them to be replaced when they are worn or broken, and holds them in position without any probability of their working loose.

The manner of securing the slats to the apron and the construction of the thimbles are shown in Figs. 9 and 10 of the drawings.

The draper S is made adjustable at any desired height, according to the height of the header-wagon, by being hinged to the sickle-bar at $t$, and supported by the bail and rope R, that passes over the part $u$, and is fastened to the lower part of the machine-frame.

The end of the reel-shaft G is made adjustable, so that the reel may be moved toward or away from the pulley H′, and the belt thus tightened, or the shaft and reel shifted out of the way, whenever it is desired to get at the other parts of the machine without throwing the parts out of working action. This is obtained by making the block V movable on the bar A′ and holding it in place by the strap X, the block having pins projecting from its under or upper surface that engage with holes in the bar or in the strap.

The fingers U are made of the shape shown in Fig. 12, in detail. The side of the finger that fits against the inclined face of the sickle-frame B is made angular, and of the same inclination from the perpendicular as the face of the frame. It has a bolt-hole, $v$, and a projecting teat, $w$, at its lower end, and by these two fastenings it is secured to the frame and held in a fixed and proper position. The upper face of these fingers is slotted in the usual manner for the sickle-knives.

These several improvements in the construction of headers, above described and shown, enable me to make a better and a stronger machine, and one that will operate to cut the grain without waste or injury to the heads.

Having thus fully described my invention, what I claim herein as new, and desire to secure by Letters Patent, is—

1. The beam C in a harvester or header, for operating the sickles, when made adjustable with reference to the machine-frame A, in the manner and for the purpose herein described and specified.

2. In a harvester or header, the combination of the adjustable beam C, for operating the sickles, and the sickle frame or bar B, adapted to be adjusted with reference to the machine-frame, substantially as and for the purposes set forth.

3. In a harvester or header, the combination, with the tongue and tiller, of the notched plates $l\ m$ and set-screws $k$, for adjusting the tiller, substantially as described and shown.

4. In a harvester or header, the combination, with the reel, of the adjustable bearing V, substantially as described and shown.

In witness whereof I have hereunto set my hand and seal.

EDWARD D. STEWART. [L. S.]

Witnesses:
C. W. M. SMITH,
EDWARD E. OSBORN.